Sept. 20, 1938.     E. L. BARKER     2,130,335
GRAVITY FEED AUTOMATIC SHUT-OFF VALVE
Filed Oct. 6, 1936
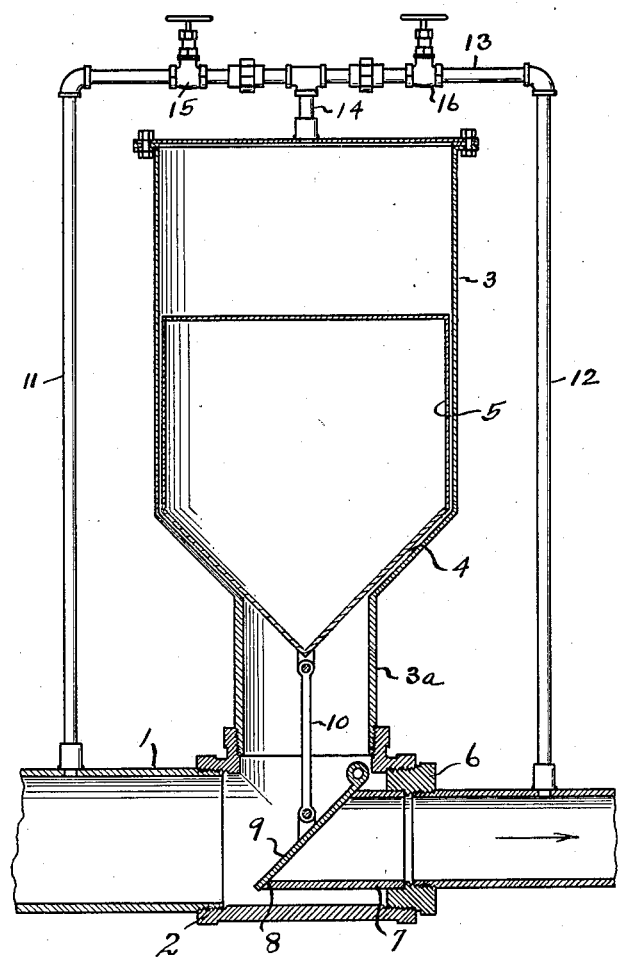
Inventor
Ernest L. Barker
By
Edward V. Hardway,
              Attorney Patented Sept. 20, 1938

2,130,335

UNITED STATES PATENT OFFICE 2,130,335

GRAVITY FEED AUTOMATIC SHUT-OFF VALVE

Ernest L. Barker, Houston, Tex.

Application October 6, 1936, Serial No. 104,229

4 Claims. (Cl. 137—68)

This invention relates to a gravity feed automatic shutoff valve.

An object of the invention is to provide a valve mechanism designed to be connected into the outflow line leading from an oil tank, or a battery of oil tanks and which will be maintained open to permit the discharge of oil from the tank or tanks and which will automatically close by gravity, when the tank, or battery is emptied to prevent the entrapping of air in the outflow line leading to the pump by which the oil is forced through the main pipe line.

Oil to be delivered to a pipe line is usually collected in a tank or a battery of tanks and an outflow line leads from the tank or tanks to the main pipe line. At intervals the contents of the tanks are released into the main pipe line. The oil is driven through the line by a pump or pumps and in order to insure the proper operation of the pump or pumps it is desirable that the outflow line from the battery of tanks be closed when the tanks are emptied so that the air will not reach the pumps or become entrapped in the line. It is a prime object of this invention to provide a valve with means for maintaining the valve open while the oil is being delivered to the main pipe line and for automatically closing the delivery line from the tanks when the tanks are emptied.

With the above and other objects in view the invention has particular relation to certain novel features of construction, operation and arrangement of parts, an example of which is given in this specification and illustrated in the accompanying drawing wherein:

The figure shows a vertical, sectional view of the valve mechanism.

Referring now more particularly to the drawing, the numeral 1 designates the outflow line leading from a tank or a battery of tanks. The oil or other liquid being handled, flows in the direction indicated by the arrow.

Incorporated into the line 1 there is a T-connection 2. A valve housing 3 upstands from said connection. The lower end 3a of this housing is reduced and screwed into the T-connection 2, the reduction forming a downwardly converging seat 4.

Within the housing 3 there is a float 5, whose lower end is tapered to conform to the taper of the seat 4.

The downstream portion of the line 1 is connected into the T-connection 2 by means of a reducing nipple 6 and attached to this nipple there is a tubular valve seat 7 whose upstream end is formed with a diagonal face 8 with which the upwardly opening valve 9 cooperates. This valve is hinged in the connection 2 and the valve is connected to the float by means of a link 10. When the float rises the valve will open and when the float descends the valve will close.

When the valve at the tank is open the oil in the tank will flow through the line 1 and will enter the housing 3, lifting the float 5 and opening the valve 9, so as to permit the free passage of the liquid on to the pipe line. When the tank is being emptied the level of the liquid in the housing 3 will descend permitting the float to fall by gravity and the valve 9 will be closed to prevent air from passing through the line 1 to the pump.

There are the tubular legs 11 and 12, which are connected into the line 1 above and below the connection 2. The upper ends of these legs are connected by the cross pipe 13, which is connected into the top of the housing 3 by means of the tubular nipple 14. On opposite sides of the nipple the pipe 13 is provided with the gate valves 15, 16.

When it is desired to run oil from the tank or battery of tanks the valve 16 should be opened to break the vacuum above the float 5 and then closed, and the valve 15 should be closed. The oil or other liquid will rise in the neck 3a and will also enter the housing 3 through the leg 11. The buoyancy of the float 5 will cause said float to rise and open the valve 9 permitting the free flow of the liquid through the line 1. The valve 15 should now be opened. When the liquid has all drained out of the tank, or battery of tanks, the level of the liquid in the housing 3 will correspondingly fall permitting the float to descend and the valve 9 to close. The housing 3 above the float communicates, through the leg 11, with the upstream portion of the line 1, thus preventing the formation of a partial vacuum above the float so that the downward movement of the float will not be retarded and the valve 9 will be promptly closed to prevent the entrapping of air in the line below the valve 9 and thus preventing the air from reaching the pump.

The legs 11, 12, and their connections into the housing, are not indispensable but their use conduces to a more efficient operation of the float and the valve to which the float is connected.

The drawing and description disclose what is now considered to be a preferred form of the invention by way of illustration only, while the broad principle of the invention will be defined by the appended claims.

What I claim is:

1. A shutoff valve mechanism for a flow line comprising a housing connected into the line and containing a float chamber whose lower end is reduced forming a downwardly converging seat, a float within the chamber whose lower end is tapered to conform to the taper of the seat and whose upper end is of approximately the same outside diameter as the inside diameter of the corresponding portion of the float chamber, a valve seat in the line whose upstream end is formed with a diagonal face, a valve arranged to cooperate with said face, a link connected at one end to the valve and at its other end to the lower end of the float.

2. A shutoff valve mechanism for a flow line comprising a housing connected into the line and containing a float chamber whose lower end is reduced forming a downwardly converging seat, a float in the chamber whose lower end is tapered to conform to the taper of said seat, a tubular valve seat in the line whose upstream end is formed with a diagonal face, an upwardly opening valve arranged to cooperate with said face to open and close said valve seat, said valve being hinged at its upper end, a link connected at one end to the valve and at its other end to the float, and conduits leading from the float chamber above the float and connected into the line on opposite sides of the valve and means for opening and closing said conduits independently.

3. A shutoff valve mechanism for a flow line comprising a valve housing whose lower end is reduced and connected into the flow line, a downwardly converging seat in the housing above the reduced lower end thereof, said housing containing a float chamber, a float within the chamber whose lower end is tapered to conform to the taper of and to fit closely on said seat and whose upper end is of approximately the same outside diameter as the inside diameter of the corresponding portion of the float chamber, a tubular valve seat in the line whose downstream end is anchored to the line and whose upstream end is formed with a diagonal seat aligned beneath the float, a valve arranged to cooperate with said diagonal seat, a link connected at one end to the valve and at its other end to the float whereby upon upward movement of the float the valve will be opened.

4. A shutoff valve mechanism for a flow line comprising a valve housing whose lower end is reduced and connected into the flow line, a downwardly converging seat in the housing above the reduced lower end thereof, said housing containing a float chamber, a float within the chamber whose lower end is tapered to conform to the taper of and to fit closely on said seat and whose upper end is of approximately the same outside diameter as the inside diameter of the corresponding portion of the float chamber, a tubular valve seat in the line whose downstream end is anchored to the line and whose upstream end is formed with a diagonal seat aligned beneath the float, a valve arranged to cooperate with said diagonal seat, a link connected at one end to the valve and at its other end to the float whereby upon upward movement of the float the valve will be opened and pipes leading from the upper end of the float chamber and terminating in the line on opposite sides of the valve and control valves incorporated into said pipes and operable independently.

ERNEST L. BARKER.